INVENTOR
HENRIK O. KYLIN

United States Patent Office 3,448,643
Patented June 10, 1969

3,448,643
TOOL SLIDE CONTROL FOR LATHES, CUTOFF MACHINES AND THE LIKE
Henrik O. Kylin, Aurora, Ohio, assignor to Bardons & Oliver, Inc., Cleveland, Ohio, a corporation of Ohio
Filed Aug. 24, 1966, Ser. No. 574,831
Int. Cl. B23b 7/14
U.S. Cl. 82—21       4 Claims

ABSTRACT OF THE DISCLOSURE

A machine tool having generally opposed hydraulically actuated tool slides movable selectively synchronously or non-synchronously through a plurality of modes, such as, advance rate, feed and return with respect to the turning axis of a rotating workpiece. Slide dynamic equilibrium and balance is attained by employing through valve means hydraulic fluid under pressure and less volume to the lead slide while supplying hydraulic fluid under pressure at increased volume to the opposed slide. Provision is also made for relative adjustment of the position of one slide with respect to that of the opposed slide.

---

This invention relates to machine tools generally of the class including lathes, cutting-off machines and the like, and more particularly is an improvement in such machines employing two generally opposed tool slides movable with respect to the turning axis of a rotating workpiece.

The present invention has for one of its objects to provide novel and unique means comprising an association or arrangement of elements by which either one and/or both tool slides may be caused to operate in a plurality of modes as, for instance, to effect relatively rapid traverse rate approach to the workpiece; to effect a relatively slower feed rate; and to effect slide return at a relatively faster traverse rate.

Another object is to provide means whereby both tool slides may be synchronized in travel during both an advance traverse rate and feed rate, and a subsequent synchronized or non-synchronized return rate.

A further object is to enable the tool slides to be actuated sequentially independently through rapid traverse advance rate, feed rate and subsequent return traverse rate.

Still another object is to enable the first of the two slides to independently be actuated sequentially through a rapid advance traverse rate, a feed rate and a rapid return traverse rate, while the second of said two slides is maintained inoperative during the cycle of operation of the said first slide.

A further object is to enable the actuation of the said first tool slide to be rendered inoperative during actuation of the second tool slide throughout the cycle of advance feed and return.

Another object is the provision of means by which the several modes of operation hereinbefore set forth may be accomplished in a very simple manner.

Another object is to selectively actuate one or both of a pair of opposed tool slides through a plurality of modes safely, efficiently and positively and at the same time to insure against malfunction of and possible injury to the mechanism.

Another object is the provision of means whereby slide equilibrium and balance may be attained and maintained by supplying hydraulic fluid at least volume to one of the slides or lead slide, while supplying hydraulic fluid at increased volume to the opposed slide.

Still another object is to obtain and maintain accurately synchronized motion of one tool slide with respect to the other.

Another object is the provision of means by which the relative positions of one tool slide with respect to that of the other tool slide may be readily adjusted.

Still another object is a machine of the character disclosed herein in which the tool slides are easily assembled in use.

Other and further objects and advantages of this invention will become more apparent from the following description and claims, reference being made to the accompanying drawings which show an embodiment of the present invention and the principles thereof, and in which drawings like reference characters are employed to designate like parts throughout the same.

Figure 1:
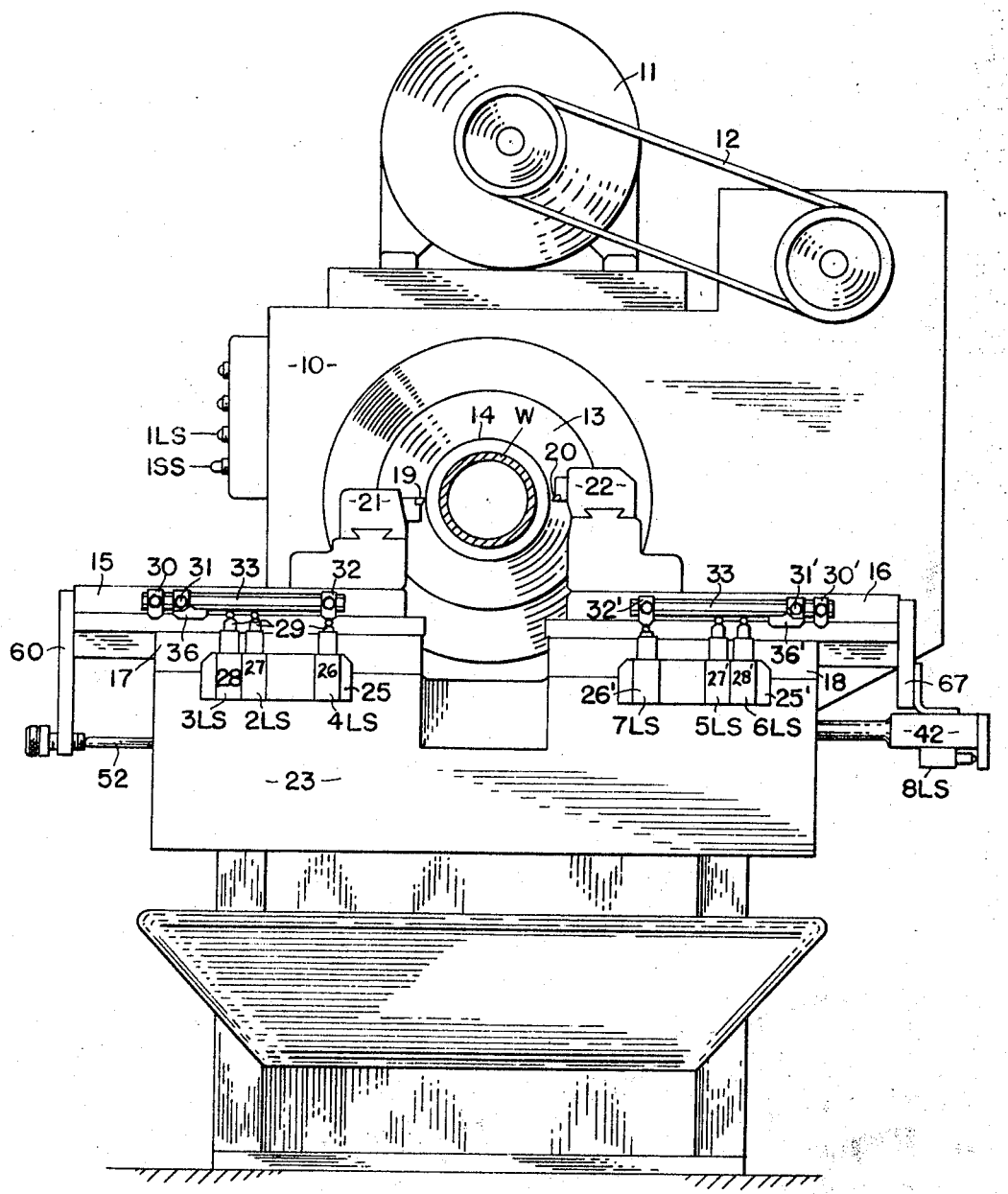
FIGURE 1 is a front end view of a lathe or cutting-off machine equipped with my invention and including generally opposed tool slides disposed one on each side of the spindle axis of rotation, together with "ADVANCE," "FEED" and "RETURN" actuating means.

Now, referring more particularly to the embodiment of my invention illustrated in the accompanying drawings, the same may be described as follows, although it is to be understood that I do not limit the same to the exact form shown, since changes may be made without departing from the scope of this disclosure.

The head stock of the machine is shown generally at 10 on which may be mounted a prime mover such as an electric motor 11 having a belt or chain drive connection 12 to rotate the hollow work spindle 13 in the conventional manner.

A workpiece W may be fed through the hollow spindle to a predetermined length against a conventional adjustable stop (not shown) and gripped therein by means of the collet 14 preparatory to a cutting off or other operation on the workpiece.

A pair of opposed cutter or tool slides 15 and 16 are disposed transversely of the spindle turning axis and these slides are adapted to travel along the rails 17 and 18, respectively, in response to the actuation of control mechanism, hereinafter to be described, to produce selective rapid traverse, feed and rapid return of either one or both of the slides and their respective cutters or tools 19 and 20 mounted in the holders 21 and 22, respectively, and adjustably fixed to the slides.

The opposed slides 15 and 16 are supported on the rails 17 and 18, respectively, and the bed end portion 23. Banks of laterally offset control units are indicated generally at 25 and 25' mounted on the bed portion 23, respectively, in fixed position thereon. These control units include limit switches indicated at 26 and 26' (RAPID APPROACH), 27, 27' (FEED) and 28, 28' (RAPID RETURN) for each of the slides 15 and 16. Each of these limit switches is coupled with a roller actuated plunger, as at 29.

Control blocks 30, 30', 31, 31', and 32, 32' are adjustably carried on and may be locked in adjusted position along a T slot 33 in each of the slides 15 and 16, respectively, by tightening the respective nuts 33' to draw up headed bolts in the slots. These control blocks have depending portions which lie in paths intersecting the normally projected plungers and rollers of the control units 26, 26', 27, 27' and 28, 28' to selectively engage the same as the slides move along the rails and to thereby actuate the respective limit switches 26, 26', 27, 27' and 28, 28' in response to the positions of the slides on the rails during such movement in either direction.

As shown in FIGURE 1, the control blocks 32 and 32' on their slides are shown in position to engage the roller carried by the RAPID FORWARD units 26, 26' which is closest to the rails 17 and 18, respectively, while the control blocks 31, 31' are offset laterally outwardly of the rails, in each instance, and of the blocks 32 and 32' so that the undersurface of each of the control blocks 31 and 31' is in position to engage and depress the plunger 29 and its roller carried by the FEED units 27 and 27' when one or both of the slides have advanced toward the workpiece at the end of a RAPID ADVANCE cycle. It will be noted that the roller engaging surfaces 36, 36' of the blocks 31, 31' are of greater length than the respective surfaces of the blocks 30, 30' and 32, 32' and thereby will engage and depress the rollers and plungers of the units 27, 27' sufficiently long enough to permit the relatively slow feed movement of one or both of the slides and their cutters to complete a cutting pass across the rotating workpiece.

The control blocks 30, 30' are offset laterally outwardly on the respective rails 17 and 18 and sufficiently beyond the blocks 31, 31' and 32, 32' to lie in the path of the roller carried by the plungers 29, 29' of the RAPID RETURN unit 28, 28' so that their undersurfaces will engage the rollers and depress the plungers to actuate the limit switch of these units.

I have provided electro-hydraulic means by which the opposed tool slides may be actuated and controlled selectively in independent fashion or in strict synchronism with each other in one direction or in opposed directions throughout actuated RAPID ADVANCE, FEED and RAPID RETURN cycles and under all cutting load conditions encountered by the cutters operatively engaging and fed into the rotating workpiece. Furthermore, such means as I employ for actuating the slides is characterized by its ability to eliminate back lash in the operation of the slides.

Figure 3:
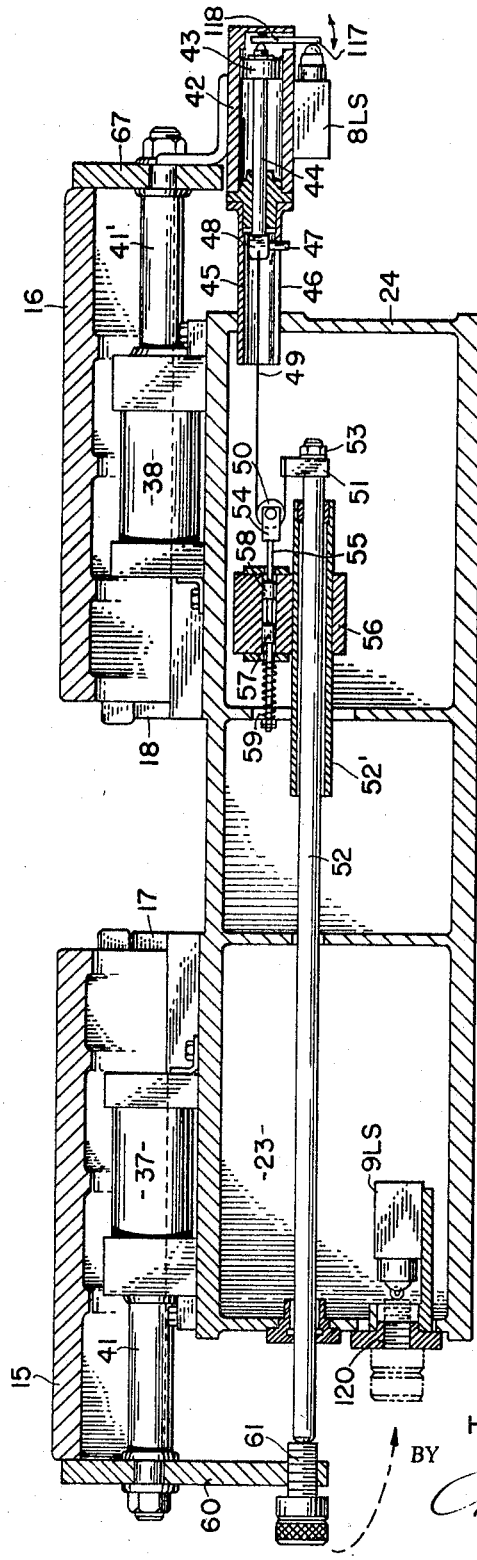
FIGURE 3 is an enlarged vertical section through the opposed slides, showing the slide operating hydraulic cylinders and some of the associated means for slide operation.
Figure 4:
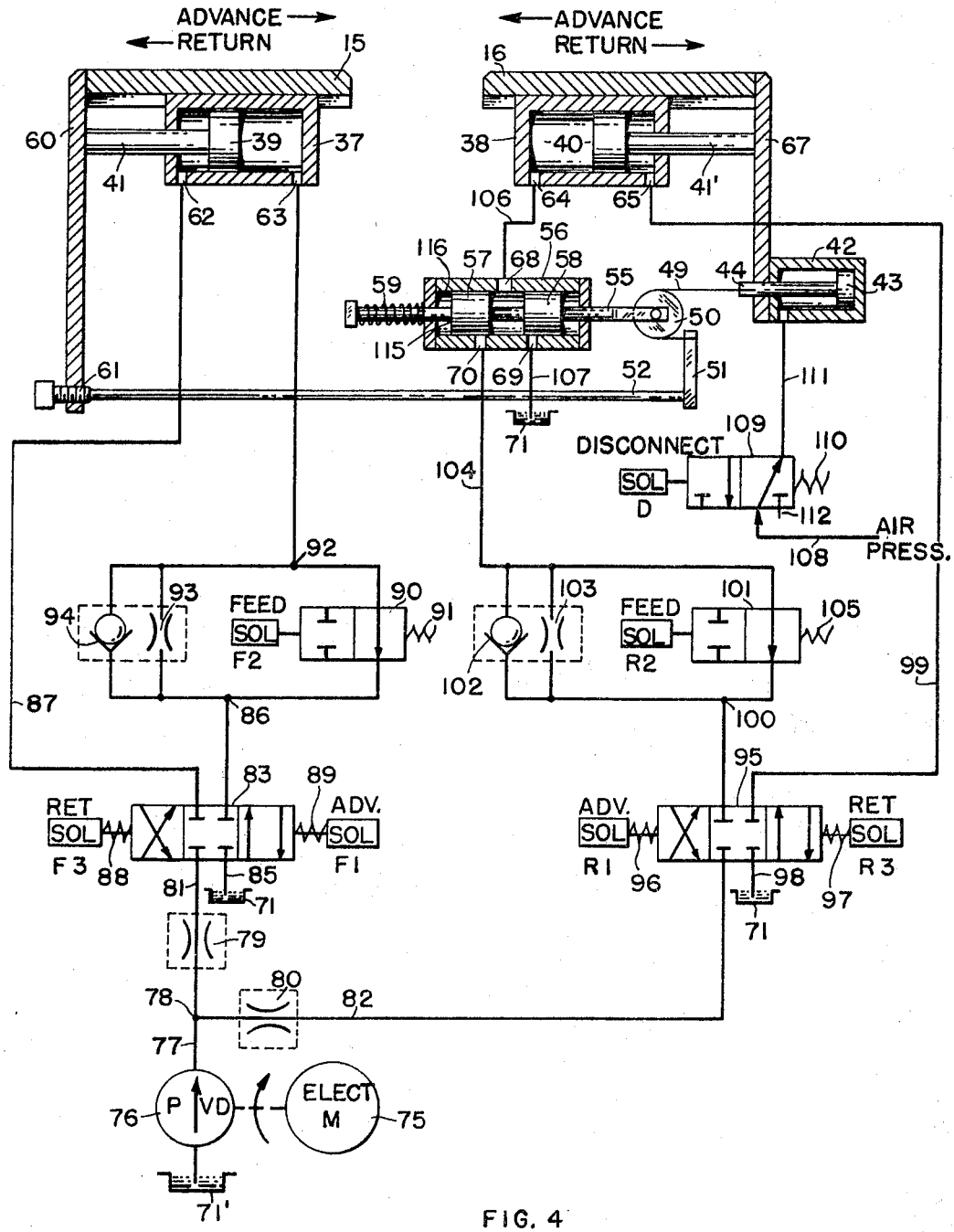
FIGURE 4 is a schematic diagram of the hydraulic circuits employed in operation of the slides either independently or in synchronized relation.

Referring now in particular to FIGURES 3 and 4, there are provided a pair of hydraulic cylinders 37 and 38 carried by the respective end portion of the bed 23. Pistons 39 and 40, respectively, operate in these cylinders under the influence of fluid pressure delivered to and exhausted from them in a manner to be described hereinafter. Piston rods 41 and 41' connect the pistons with the outer ends of the slides 15 and 16 to actuate the slides in response to the operation of the hydraulic and electric control circuitry later to be described.

The slide 16 carries at its rear end a cylinder 42 movable with the slide and which houses a piston 43 and piston rod 44 which extends through the forward end of the cylinder 42 and into a tube 45. The tube 45 has a longitudinal slot 46 through which the pin 47 extends and along which the pin, which is carried by a head 48 on the free end of the plunger rod 44, is guided during the axial movement of the rod 44.

Secured to the head 48 is one end of a narrow non-stretchable band or tape 49 which extends outwardly through the tube 45 and over an idler wheel or pulley 50, the other end of the band or tape being secured to a block 51 fixed on the inner end of the rod 52 axially movable in the tube 52'. The block 51 may be secured in place and removed by means of a nut 53. The depending pin 47, operating through and along the slot 46, prevents twisting or turning of the band or tape 49. The wheel or pulley 50 is mounted in a bearing member 54 secured to an end of the plunger rod 55 which is reciprocable in a control valve cylinder 56 and on which rod the valve heads 57 and 58 are secured in spaced relation. The plunger rod 55 extends at its rear end through an opening in the cylinder 56 and carries a coiled spring 59 which exerts a force of compression to normally urge the plunger rod 55 to the left in FIGURES 3 and 4, thereby serving to eliminate slack in the tape or band 49.

The slide 15 is actuated by the piston rod 41 which is anchored to the end wall of the slide as at 60. This depending end wall of the slide carries an adjustable screw 61 which is in axial alignment with the rod 52 and can be adjusted to limit the axial movement of the slide 15 and consequently the slide 16 which is coupled with the first mentioned slide through the flexible band 49.

Pistons 39 and 40, respectively, operate in cylinders 37 and 38, respectively, under the influence of fluid pressure delivered to and exhausted from them through the ports 62–63 and 64–65 in a manner to be described hereinafter. Piston rods 41 and 41' connect the pistons with the outer ends of the respective slides 15 and 16 at 60 and 67 to actuate the slides in response to the operation of the hydraulic and electric control circuitry to be later described.

The control valve 56 is provided with the ports 68, 69 and 70, the port 68 being connected with the port 64 which is located substantially midway of the length of the cylinder 56 and between the valve heads 57 and 58 when the ports are positioned as shown in FIGURE 4.

The port 69 delivers exhaust fluid to the sump 71.

In FIGURE 4 is shown the hydraulic system employed in actuating the slides, in diagrammatic form, the same being operable to accomplish the several modes referred to hereinbefore. In this figure, the motor 75 drives the pump 76 to supply fluid under pressure from a source 71' to the line 77, and thence from 78 through adjustable flow restrictors 79 and 80 supplying fluid pressure substantially equally to the lines 81 and 82, respectively. By means of the restrictors 79 and 80, the volume flow of fluid pressure may be adjusted in each of the lines 81 and 82 to the lead cylinder 37 and the follow cylinder 38, respectively, thereby affording means to attain and maintain a balance or equilibrium in these cylinders and slides, respectively, which are actuated by the pistons operating therein. Line 81 supplies an ADVANCE-RETURN valve 83 which when actuated by the solenoid F–1 connects line 81 with line 87 and line 85 with line 86. On the other hand, on actuation of solenoid F–3, the valve 83 is shifted to connect lines 81 and 86 as well as lines 87 and 85. The valves 83 is normally urged to a centering position as shown in FIGURE 4 when neither solenoid F–1 nor F–3 is energized by means of the springs 88 and 89, respectively, to thereby block flow of fluid through the valve.

Line 87 connects valve 83 with the port 62 of slide cylinder 37.

A valve 90 is actuated by the compression of spring 91 in one direction to allow fluid flow through the valve 90 to connect lines 86 and 92, and is actuated in a reverse direction by the solenoid F–2 to block flow of fluid between lines 86 and 92. Line 92 connects with port 63 of cylinder 37. I provide a restrictive passage 93 through which fluid may flow between lines 92 and 86. Fluid may also flow from 86 to line 92 in one direction only through the check valve 94.

From the above, it will be seen that the valves 83 and 90 may be caused to operate to produce selective movements of the cylinder 37 and slide 15 corresponding to a RAPID ADVANCE or traverse rate by fluid flow through 87 and port 62 on one side of the piston 39, and to return fluid on the other side of the piston through port 63, line 92, valve 90 and restrictor 93 to line 86.

FEED rate ADVANCE is accomplished by blocking fluid passage through valve 90 and allowing fluid flow from line 92 to line 86 to be directed only through the restrictive passage 93.

RETURN of the slide at a traverse or rapid rate is obtained by causing fluid flow from 86 to 92 through restrictor 93 and the check valve 94, and, depending upon the actuation of solenoid F–2 also through valve 90 and thence line 92 to port 63 of the slide cylinder 37. Return flow from cylinder 37 is through line 87.

Further tracing the fluid system, a line 82 leading from the outlet side of the restrictor 80 connects with an ADVANCE-RETURN valve 95 which, like the valve 83 is normally urged to mid or neutral position by the springs 96 and 97 when the solenoids R–1 and R–3 are de-energized, thus blocking flow through the valve. A line 98 leads from this valve to a sump 71 and a line 99 connects the valve with the port 65 of the slide cylinder 38. Line 100 connects valve 95 with the valve 101 and also the check valve 102 and restrictive passage 103. Line 104 connects valve 101, restrictive passage 103, and check valve 102 with cylinder 56, terminating at port 70. The valve 101 is urged under the compression of spring 105 to permit passage of fluid from line 100 to line 104 and is actuated by energizing solenoid R–2 to block flow from line 100 to line 104. Fluid may flow through restrictive passage 103 and in one direction only through check valve 102.

The valve members 57 and 58 are mounted on the valve rod or stem 55 and are axially spaced apart with respect to the fluid ports 70 and 69 such that when stem 55 is axially moved to permit fluid flow between lines 104 and 106, flow is blocked to line 107 leading to a sump 71. Similarly, when stem 55 is displaced axially to allow fluid flow between lines 106 and 107, flow is blocked to line 104.

A conduit 108, having communication with a source of air under pressure (not shown) supplies air pressure to the valve 109 which, under the compression of spring 110, is actuated to connect lines 108 and 111. This urges the piston 43 to the position shown in FIGURE 4, overcoming the compression of spring 59.

Solenoid D, when actuated, will move the valve 109 against the compression of spring 110 to the right in FIGURE 4 to block air pressure through the valve and thereby connect line 111 with line 112, which is open to atmosphere.

The adjustable screw 61 is threaded into the member 60 and is adjusted therein to displace the valve stem 55 and the valve heads 57 and 58 thereon, so that the facing end surfaces of the heads are positioned between the ports 70 and 69, at the same time establishing a compressive load on the spring 59. This will result in tautness of the tape or band 49, since air under pressure is at the same time present in cylinder 42, to hold piston 43 in the position shown in FIGURE 4.

Movement of the slide 15 in an ADVANCE direction (to the right, FIGURE 4) will move rod 52, member 51 and valve stem 55 in the same direction to open port 69 and communicate line 107 through port 68 with line 106 and, at the same time, closing port 70. Movement of slide 15 in the RETURN direction (left in FIGURE 4) will permit valve stem 55 and the heads 57, 58, member 51 and rod 52 to move in the same direction under the compression forces of spring 59, to open port 70 and communicate line 104 through port 68 with line 106 and, at the same time, close port 69.

It then follows that, with properly sequenced operation of valves 83 and 95 and valves 90 and 101, the following motions of slides 15 and 16 may be accomplished in a synchronized manner.

ADVANCE to cylinder 37 and slide 15 is by flow through valve 83 and line 87 to cylinder 37 thence flow from the cylinder through line 92 and restrictive passage 93 and depending on F–2 through or not through valve 90, then line 86, and valve 83 to the sump 71. ADVANCE to cylinder 38 and slide 16 is by flow through valve 95 and line 99 to cylinder 38 thence from the cylinder and line 106, the now opened port at 69 and line 107 to sump 71.

RETURN at a traverse rate is obtained at cylinder 37 and slide 15 by flow through valve 83 to line 86 then through check valve 94, restrictive passage 93, and, depending on F2, valve 90 to line 92 and cylinder 37, and return flow from the cylinder through line 87, valve 83, line 85 to sump 71. RETURN at a traverse rate is obtained at cylinder 38 and slide 16 by flow through valve 95 to line 100 then through check valve 102, restrictive passage 103 and, depending on R2, valve 101 to line 104 and the now opened port at 70 and line 106 to cylinder 38. Return flow from cylinder 38 is through line 99 and valve 95 to sump 71.

When the slide 15 is moving in ADVANCE direction, the valve stem 55 will move in the same direction, effecting an opening at port 69 and as slide 15 continues to move, the area of the opening is increased. ADVANCE movement of slide 16 causes stem 55 to move in that same direction under the influence of spring 59 causing a decrease in the area of the opening at port 69. As a result, a condition of equilibrium is established whereby slide 16 will advance at the same rate as slide 15. Conversely, when slide 15 is moving in RETURN direction, an opening is effected at port 70. RETURN movement of slide 16 effects a decrease in the opening at port 70 and an equilibrium is established whereby slide 16 will return at the same rate as slide 15.

It will be seen that the axial position of the valve stem 55 may be changed by rotating the screw 61 because of the action of the spring 59 on the one hand and the taut band or tape 49 on the other. In order to maintain the dynamic equilibrium condition existing at the ports 70 and 69, slide 16 will seek and find a changed position corresponding to the adjustment of the screw 61 in the member 60.

Solenoid D actuates valve 109 to release air pressure from cylinder 42 and permit freedom of movement of the piston 43 therein which, of course, allows the spring 59 to urge the valve stem 55 to the full left position in cylinder 56, blocking port 69 and communicating ports 68 and 70 through the cylinder.

As described before, the arrangement and function of the valve elements is such that the two slides may move in ADVANCE direction in a manner such that the movement of one slide 16 is synchronized with the movement of the slide 15. By proper actuation of valve solenoids D, R2 and R3, slide 16 may be caused to return at a traverse rate while slide 15 is continuing to ADVANCE at a feed rate.

Upon removal of the screw 61 from the member 60 of slide 15, the influence of the spring 59 will cause the valve stem 55 to move to bring the rear face 115 of the valve head 57 into abutment with the left end wall 116 of the cylinder 56 uncovering port 70 completely to establish communication in the cylinder 56 between the heads 57 and 58 with the port 64 of cylinder 38 and completely closing port 69.

By selective actuation of valves 95 and 101 in a manner to be hereinafter described, the following motions may be effected in the slide 16:

ADVANCE at a traverse rate is accomplished by fluid flow through line 99 to the cylinder 38 through port 65, and return flow through port 64, lines 106, 104, and restrictor 103 and valve 101 to line 100, while ADVANCE at a FEED rate is attained by blocking fluid flow through valve 101 and permitting flow from line 104 to line 100 only through the restrictor 103.

RETURN of slide 16 at a traverse rate occurs by fluid flow from line 100, through restrictor 103 and check valve 102, and, depending upon an actuation of solenoid R2, also through valve 101. From line 104, flow is through valve 56 to line 106 and cylinder 38. Return flow is through line 99.

Figure 5:
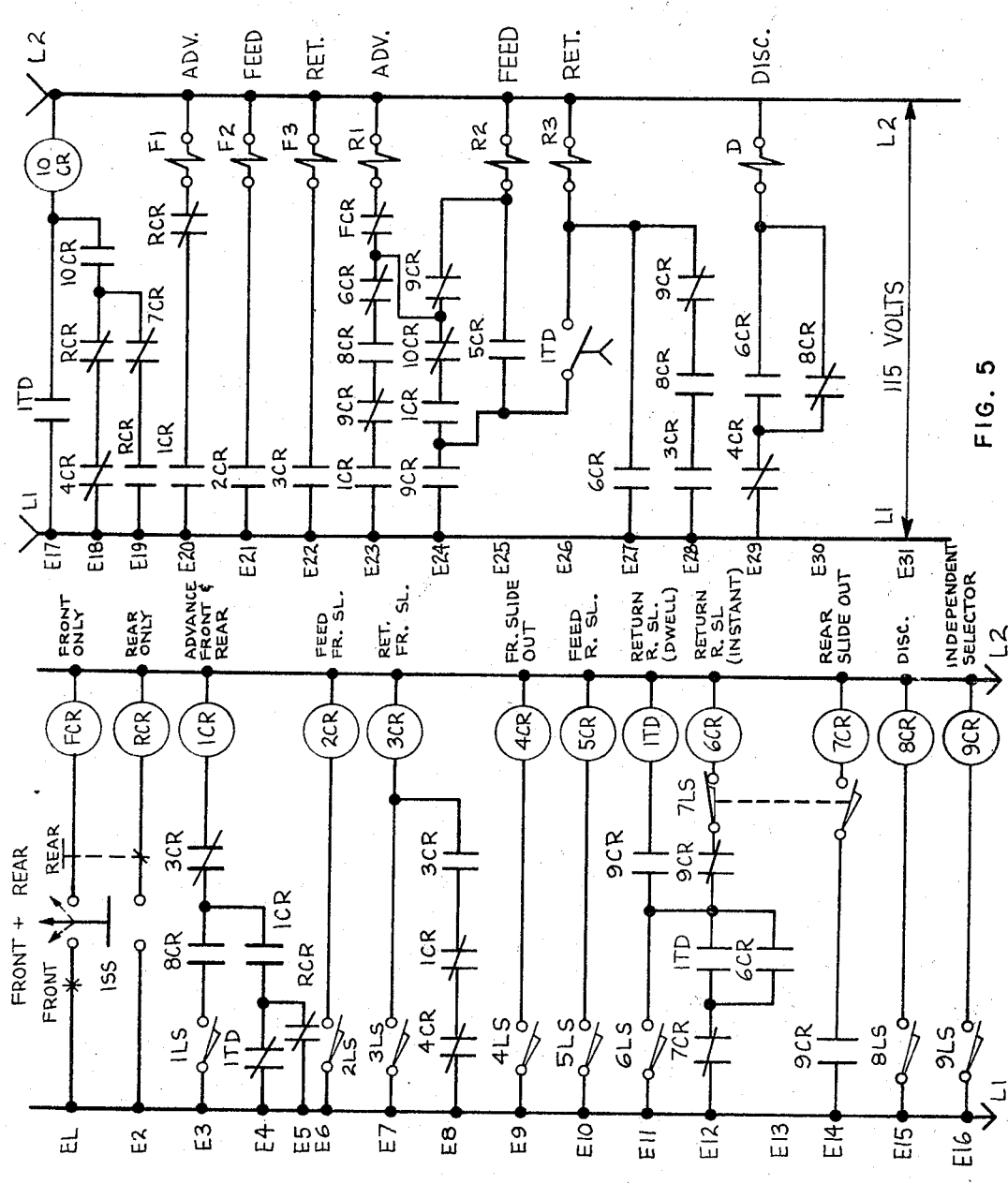
FIGURE 5 is a schematic diagram of electric circuitry employed in the selective operation of one and/or both slides.

Referring now to FIGURE 5, I have shown electric circuitry which may be utilized in conjunction with the fluid pressure system described above to accomplish the several modes of operation of the slides in accordance with this invention.

Figure 2:
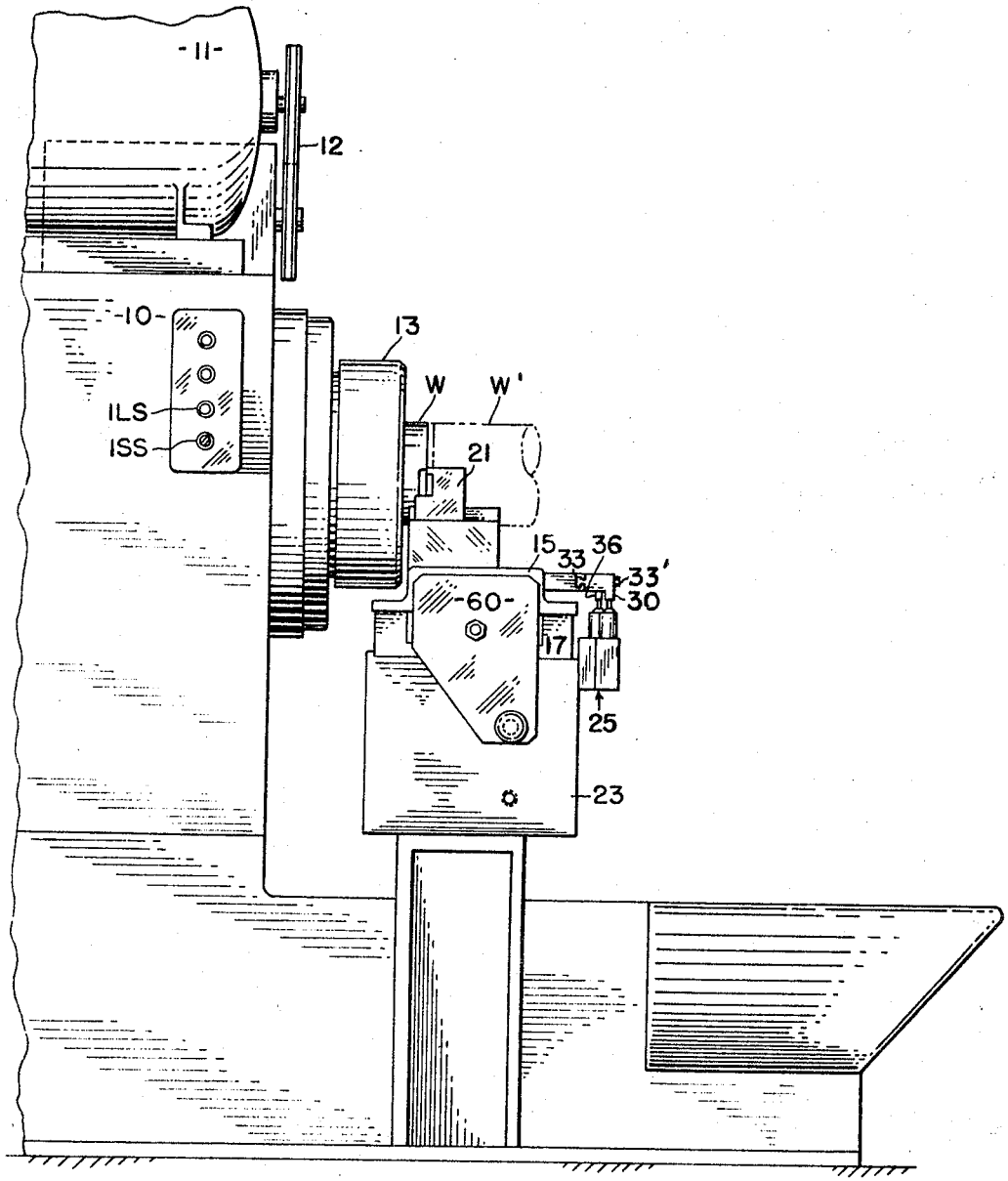
FIGURE 2 is a side elevation of the front end portion of the machine as illustrated in FIGURE 1.

Switch 1LS is mounted on the main frame of the machine as indicated in FIGURES 1 and 2 and functions to start an automatic cycle of operation effecting actuation, in a predetermined manner, of one or both slides 15 and 16.

While not shown, one or more other switch elements or control means may be provided in electrically parallel association with 1LS for effecting automatic cycling operation, if desired.

A selector switch 1SS is employed (FIGURES 1, 2 and 5) for selection of operation of the front slide 15 only, the rear slide 16 only or the front and rear slides together, and is also located on the main frame of the machine in an enclosure carrying the switch 1LS.

Switches 2LS, 3LS and 4LS are located as shown in FIGURE 1 and are operated by the switch blocks 30, 31 and 32 adjustably secured to the slide 15, while switches 5LS, 6LS and 7LS are operated by the switch blocks 30', 31' and 32' adjustably secured to the slide 16.

Switch 8LS is located as shown in FIGURES 1 and 3 and is operated by the lever 117 pivoted at 118 and carried in the rear end of the cylinder 42 when piston 43 is at the end of cylinder 42, as shown in FIGURE 3.

Switch 9LS is also located as shown in FIGURE 3 and is actuated by screw 61 when it is removed from the member 60 and threaded into a threaded opening 120.

Solenoids F1, F2, F3, R1, R2, R3 and D are the actuating devices for valves 83, 90, 95, 101 and 109, respectively, as shown clearly in FIGURE 4.

Referring to FIGURE 5, I will now describe in further detail the circuitry employed. Electric current is supplied to lines L1 and L2. During ADVANCE and RETURN movements of the slides, each switch 2LS through 7LS may or may not be actuated by its associated switch operating block, depending upon the mode of operation selected. Each switch so actuated will be restored to its original condition before a cycle of operation is completed.

It is presumed that at the start of the automatic cycle of operations in each mode, the slides 15 and 16 will be in their respective receded or returned positions as shown in FIGURE 1. Switch blocks 32 and 32' may or may not be positioned to actuate 4LS and 7LS, respectively, at this time depending on the mode of operation chosen.

When tracing the steps in the circuitry employed to energize the valve solenoids, electrical interlocking sequences are used as is well know to the art. In certain instances, valves are operated in the interest of circuit simplicity, even though their operation is not a requirement for specific slide operation.

The following are examples of mode operations as outlined hereinbefore:

One mode of operation may consist of operating both slides in synchronism through ADVANCE toward the workpiece at a traverse rate, ADVANCE at a feed rate and finally RETURN at a traverse rate. The switch block 30' for 6LS should be positioned on its support to be ineffective. Switch blocks 31' and 32' may or may not be positioned to actuate the respective switches 5LS and 7LS. The screw 61 is positioned as shown in FIGURES 3 and 4 abutting rod 52. Selector switch 1SS is positioned as indicated in FIGURE 5 at "Front plus Rear." Switch 8LS will remain actuated during the entire cycle of operations. There will be no completed electrical circuits in lines E1, E2, E11, E16, E17, E18, E19. When switch 1LS is closed, solenoids F1 and R1 will be energized causing slides 15 and 16 to advance at a traverse rate until 2LS is actuated. When this occurs, F2 is actuated and the slides 15 and 16 will advance at a feed rate determined by restrictor 93 until 3LS is actuated. When 3LS is actuated, F3 and R3 are energized, returning the slides at a traverse rate until 4LS is actuated. This results in F3 and R3 becoming de-energized whereupon the slides will stop, ending the automatic cycle.

In the second mode, both slides are synchronized in operation for ADVANCE travel at a traverse rate, and then at a FEED rate, then both slides separate in operation for RETURN at a traverse rate. In this cycle of operation, it is necessary that the switch actuating blocks for 6LS and 7LS be positioned to be effective in the operation of their respective switches. The switch block for 5LS may or may not remain positioned to actuate 5LS. Screw 61 and selector switch 1SS remain as outlined in connection with the first mode or operation described above. There will be no completed circuits in line E1, E2 and E16. When switch 1LS is closed, F1 and R1 will be energized, causing slides 15 and 16 to ADVANCE at a traverse rate until 2LS is actuated. This results in energizing F2 whereby the slides advance at FEED rate determined by restrictor 93. The switch block for 6LS must be positioned to actuate 6LS before the switch block for 3LS actuates 3LS. Actuation of 6LS will cause R3 and D to be energized to RETURN slide 16 at a traverse rate until 7LS is actuated to de-energize R3 and D, bringing the slide to a stop. Actuation of 3LS causes F3 to be energized and slide 15 to RETURN at a traverse rate until 4LS is actuated to de-energize F3 to stop the slide movement at the end of the automatic cycle.

In the third mode of operation, both slides separate for ADVANCE travel at traverse rate, ADVANCE at feed rate and then RETURN travel at traverse rate.

In this mode, the switch actuating blocks for all switches 2LS through 7LS must be positioned to be effective in the actuation of their respective switches. Screw 61 is removed from its position in member 60 in FIGURE 4 and threaded into the opening 120, as shown in FIGURE 3, actuating switch 9LS. Removing screw 61 from end wall 60 allows valve stem 55 to move to the left under the influence of spring 59 effecting communication between lines 104 and 106 through port 70. Selector switch 1SS is at "Front plus Rear." Switch 8LS will remain actuated during the entire cycle of operation. There will be no completed circuits in lines E1 and E2. Closing switch 1LS will energize F1 and R1 causing slides 15 and 16 to ADVANCE at traverse rate. When 2LS is actuated, F2 is energized, causing slide 15 to ADVANCE at FEED rate which, as before, is determined by restrictor 93. Actuation of 5LS energizes R2 causing slide 16 to advance at FEED rate determined by restrictor 103. It is presumed that the rear slide 16 will complete its forward travel at a feed rate and actuate 6LS before the front slide 15 actuates 3LS. When 6LS is actuated, it causes slide 16 to RETURN at a traverse rate until 7LS is actuated to de-energize R3 and stop the movement of the slide. When the front slide 15 actuates 3LS, F3 is energized to RETURN the slide at a traverse rate until 4LS is actuated to de-energize F3 to stop slide 15. This completes the automatic cycle.

In mode four, the second or rear slide is inoperative and the first or front slide is operative for ADVANCE travel at traverse rate, advance to FEED rate and RETURN travel at traverse rate. For operation through a cycle defined in this mode as outlined above, it is the purpose to provide cyclic movement to the front slide 15 while the rear slide 16 is inoperative. The actuating switch blocks for 2LS, 3LS and 4LS must be positioned to effect actuation of their respective switches. The switch blocks for 5LS, 6LS and 7LS may or may not remain positioned. Screw 61 is positioned to actuate 9LS as in the next preceding mode. A selector switch 1SS is positioned at "Front" to effect a circuit in line E1. Switch 8LS will remain actuated during the cycle of operations. There will be no completed circuit in lines E2, E10, E11, E12, E17, E18, E19, E23, E24, E25, E26, E27 and E28. When switch 1SS is closed, F1 will be energized to cause slide 15 to ADVANCE at a traverse rate of travel. When 2LS is actuated, F2 is energized to cause this slide to move at a FEED rate determined by restrictor 93 until 3LS is actuated. Upon actuation of 3LS, F3 is energized, effecting RETURN at a traverse rate until 4LS is actuated, causing F3 to be de-energized and the slide to come to rest, ending the automatic cycle.

In the fifth mode, the first or front slide 15 is inoperative and the second or rear slide 16 is placed in operation for ADVANCE travel at a traverse rate, ADVANCE travel at a feed rate and RETURN at a traverse rate. It is the purpose in this mode to provide cyclic motion to the rear slide 16 while the front slide 15 is inoperative. Actuating switch blocks 5LS, 6LS and 7LS must be positioned to effect actuation of their respective switches. The switch blocks for 2LS, 3LS and 4LS may or may not remain positioned. Screw 61 is positioned as in FIGURE 3 in the opening 120 to actuate 9LS. The selector switch 1SS is positioned at "Rear," effecting a circuit in line E2. Switch 8LS will remain actuated during the cycle of operations. There will be no completed circuit in lines F1, E6, E7, E8, E20, E21, and E22. When switch 1SS is closed, R1 will be energized thereby causing slide 16 to ADVANCE at a traverse rate. When 5LS is actuated, R2 is energized, causing the slide to move at a FEED rate determined by restrictor 103 until 6LS is actuated, causing R3 to be energized to effect RETURN of the slide at a traverse rate until 7LS is actuated to de-energize R3, thus bringing the slide to rest and ending the automatic cycle.

The foregoing description and accompanying drawings are considered as illustrative only of the principles of the invention and the tool slide control for lathes, cutoff machines and the like of the present invention is not to be regarded as limited by the above described embodiments. Alternative arrangements of parts, substitution of materials and other organization and assembly procedures, apparent to those skilled in the art, may be employed without departing from the scope and spirit of the invention as claimed.

I claim:

1. In a machine tool, a rotatable work support, means for rotating the support, a slide support, first and second tool carrying slides disposed on said slide support for selective relative movement respectively in opposed directions transversely of the turning axis of the rotatable work support, means coupling said slides, hydraulic powered means for establishing rate and direction of movement of the slides through advance, feed and return cycles, said hydraulic means including a source of fluid pressure, a control slide valve including a valve stem, a hydraulic motor for actuating each of said slides, each of said motors having fluid pressure communication with said pressure source and said second slide motor being interconnected with said control valve, means coupling said control valve with and primarily responsive to the movement of the first of said slides and secondarily responsive to movement of said second slide to effect a dynamic equilibrium of rate of movement of said second slide with respect to said first slide through advance, feed and return movements of the slides, said coupling means comprising a rigid member actuated by said first slide, a flexible member attached at one end to the rigid member and interconnected at its other end to the second slide, said flexible member also being connected between its ends to the stem of the control valve, and means normally urging the control valve stem in a direction to maintain the flexible member taut, said last named means including a compression member exerting a force of compression in one direction axially along said control valve stem.

2. In a machine tool, a power driven, rotatable work support, first and second opposed tool carrying slides, hydraulic motor means for moving each slide in directions transverse to the rotating axis of the work support, a single power source of fluid under pressure, hydraulic motor means for establishing rates and direction of movement of the slides through advance, feed and return cycles, first slide valved means interconnecting said first slide hydraulic motor with said fluid power source and said slide rate establishing means for establishing direction and rate of movement to said first slide, second slide valved means interconnecting said second slide hydraulic motor with said fluid power source and said second slide rate establishing means, means coupling said first and second slides to effect a dynamic equilibrium of motion of the second slide with respect to that of the first slide, said coupling means including a hydraulic control valve in fluid pressure communication with said second slide motor and with said fluid pressure power source, said valve having a valve stem, a compression spring on said stem normally exerting an axial force of compression along said stem in one direction, said coupling means further including a flexible elongate member attached at its one end to move with said second slide, a rigid member positioned at one end against and actuated by said first slide, the other end of said flexible member being attached adjacent to the opposite end of said rigid member, said flexible member and said valve stem being interconnected to place the valve stem spring under compression and to maintain a taut condition in the flexible member.

3. The structure defined in claim 2 which includes a releasable fluid pressure valve attached to the second slide and movable therewith, whereby the compressive force of said control valve stem may be selectively established and released to respectively couple and uncouple the second slide to said control valve.

4. The structure defined in claim 3 which includes an axially adjustable member carried by the first slide and remote from the control valve engaging said one end of the rigid member, for axial adjustment of the control valve stem against compressive forces exerted by the valve stem spring.

References Cited

UNITED STATES PATENTS

| | | | |
|---|---|---|---|
| 1,212,257 | 1/1917 | Pokora | 82—21 |
| 2,757,546 | 8/1956 | Kendall et al. | 82—25 X |
| 3,066,553 | 12/1962 | Kimsey | 82—21 |
| 3,315,550 | 4/1967 | Kylin | 82—21 |

LEONIDAS VLACHOS, *Primary Examiner.*

U.S. Cl. X.R.

82—25